(12) United States Patent
Seto (10) Patent No.: US 9,256,819 B2
(45) Date of Patent: Feb. 9, 2016

(54) DEVICE CAUSING A PRINTING APPARATUS TO EXECUTE PRINTING ACCORDING TO A SELECTED PRINT MEDIUM ATTRIBUTE

(71) Applicant: CANON KABUSHIKI KAISHA, Tokyo (JP)

(72) Inventor: Noriaki Seto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/139,646

(22) Filed: Dec. 23, 2013

(65) Prior Publication Data

US 2014/0185069 A1 Jul. 3, 2014

(30) Foreign Application Priority Data

Dec. 27, 2012 (JP) ................................ 2012-285806

(51) Int. Cl.
*G06K 15/00* (2006.01)
*H04N 1/00* (2006.01)
*H04N 1/23* (2006.01)

(52) U.S. Cl.
CPC .......... *G06K 15/4065* (2013.01); *G06K 15/005* (2013.01); *H04N 1/00477* (2013.01); *H04N 1/00482* (2013.01); *H04N 1/2323* (2013.01); *H04N 1/2338* (2013.01); *H04N 1/2392* (2013.01); *H04N 2201/0082* (2013.01)

(58) Field of Classification Search
USPC .................................................. 358/1.9, 1.6
See application file for complete search history.

(56) References Cited

U.S. PATENT DOCUMENTS

| | | | | |
|---|---|---|---|---|
| 2003/0230842 | A1* | 12/2003 | Shiho et al. | 271/9.01 |
| 2007/0146789 | A1* | 6/2007 | Mima et al. | 358/1.16 |
| 2008/0080000 | A1* | 4/2008 | Kadota | G06K 15/129 358/1.15 |
| 2013/0135638 | A1* | 5/2013 | Inui | 358/1.9 |

FOREIGN PATENT DOCUMENTS

JP 4915330 B2 4/2012

* cited by examiner

*Primary Examiner* — Barbara Reinier
(74) *Attorney, Agent, or Firm* — Canon U.S.A., Inc., IP Division (57) ABSTRACT

An apparatus includes an acquiring unit configured to acquire information for specifying an attribute of a printing medium, a first control unit configured to, in a case where an attribute of a printing medium corresponding to a first printing and an attribute specified by the information newly acquired by the acquiring unit for a second printing are different, control the printing apparatus so that the second printing is not executed, a display control unit configured to cause a display to display a screen for confirming an attribute of a printing medium, in accordance with an instruction by the user, and a second control unit configured to control the printing apparatus so that the control by the first control unit is not executed and the second printing is executed, on the condition that the screen be displayed before the acquisition of the information corresponding to the second printing.

14 Claims, 10 Drawing Sheets

PAPER SETTINGS FOR COPYING

PAPER SIZE  B5 ▽
PAPER TYPE  PLAIN PAPER ▽

PAPER SETTINGS FOR FAX

PAPER SIZE  A4 ▽
PAPER TYPE  PLAIN PAPER ▽

PAPER SETTINGS FOR
CLOUD PRINTING

PAPER SIZE  A4 ▽
PAPER TYPE  PLAIN PAPER ▽

DEVICE CAUSING A PRINTING APPARATUS TO EXECUTE PRINTING ACCORDING TO A SELECTED PRINT MEDIUM ATTRIBUTE

BACKGROUND

1. Field

Aspects of the present invention generally relate to an apparatus, method, and computer-readable recording medium for controlling a printing apparatus.

2. Description of the Related Art

In related art, there are printing apparatuses that can print images on multiple types of printing media. Such printing apparatuses allow images to be printed on, for example, printing papers with different surface characteristics such as plain paper and glossy paper, or printing papers of various sizes. Specifically, the user sets printing paper of desired size and type in a printing apparatus, and registers the size and type of this printing medium as print settings. Then, when the user gives a print instruction, an image is printed in accordance with the print settings registered in the printing apparatus.

When changing the print settings and causing printing to be executed anew in such a printing apparatus, a printing medium corresponding to the changed print settings needs to be set in the printing apparatus by the user. At this time, appropriate printing may not be performed in some cases if the user does not set the printing medium.

In Japanese Patent No. 4915330, it is described that paper information, which indicates information such as the size and type of the printing paper to be used in printing, is stored into a memory unit as print settings. Further, it is described that in a case where a printing apparatus is instructed to execute printing in accordance with print settings different from the print settings stored in the memory unit, a warning for prompting the user to confirm the printing paper is displayed, and the instructed printing is restricted.

However, in the related art mentioned above, printing is restricted when the print settings stored in the memory unit are changed. Accordingly, there are cases where printing is restricted even though the user has changed the print settings and has set an appropriate printing medium corresponding to the changed print settings.

For example, suppose that in a case where a printing apparatus including a FAX function is set so as to use plain paper in printing FAX-received images, the user confirms that plain paper is to be used in printing FAX-received images, and sets plain paper. However, in the related art mentioned above, in a case where printing is executed in accordance with print settings other than plain paper prior to printing of FAX-received images, the print settings stored in the memory unit and the print settings for the printing of the FAX-received images are different. Consequently, printing of the FAX-received images is restricted even though the user has set plain paper.

SUMMARY

In view of the above, an apparatus is provided that can prevent printing from being restricted even though the user has confirmed the printing medium to be used in executing the printing.

An apparatus according to the present disclosure includes an acquiring unit configured to acquire information for specifying an attribute of a printing medium to be used in printing by a printing apparatus, a first control unit configured to, in a case where an attribute of a printing medium corresponding to a first printing executed by the printing apparatus and an attribute specified by the information newly acquired by the acquiring unit for a second printing newly executed by the printing apparatus are different, control the printing apparatus so that the second printing is not executed, a display control unit configured to cause a display to display a screen for confirming an attribute of a printing medium to be used in printing by the printing apparatus, in accordance with an instruction by a user, and a second control unit configured to control the printing apparatus so that the control by the first control unit is not executed and the second printing is executed, on a condition that the screen is displayed before the acquisition of the information corresponding to the second printing.

Further features of the present disclosure will become apparent from the following description of exemplary embodiments with reference to the attached drawings.

DESCRIPTION OF THE EMBODIMENTS

Figure 1:
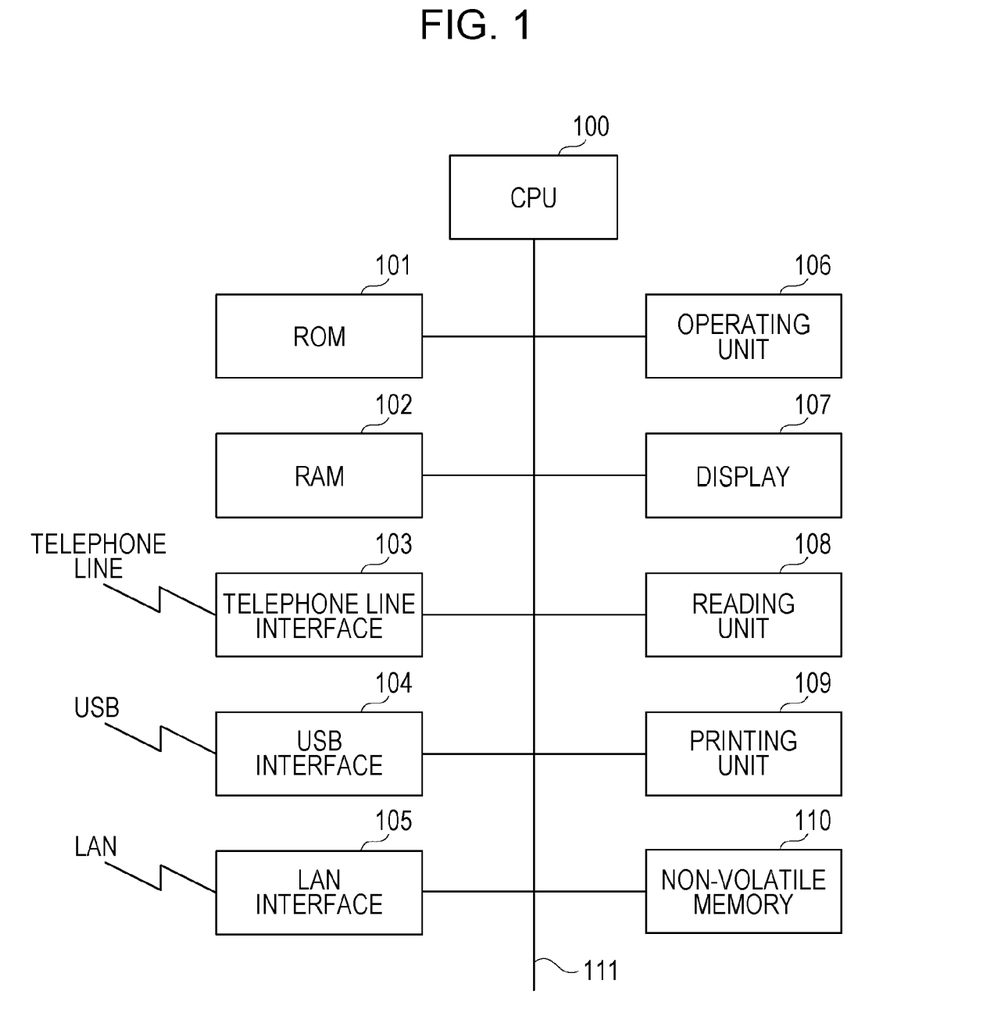
FIG. 1 illustrates a configuration of a printing apparatus according to the embodiment.

FIG. 1 illustrates a configuration of a printing apparatus according to the embodiment.

Reference numeral 100 denotes a CPU. The CPU 100 controls various units of the printing apparatus. Reference numeral 101 denotes a ROM. Various control programs for the CPU 100 to control various units of the printing apparatus are stored in the ROM. Reference numeral 102 denotes a RAM. The RAM 102 is a memory for temporarily storing the various control programs in the ROM 101, information on various settings of the apparatus, image data, and the like.

The CPU 100 expands the control programs stored in the ROM 101 into the RAM 102, and executes the programs with the RAM 102 as a work memory, thereby controlling various units of the printing apparatus.

Reference numeral 103 denotes a telephone line interface. The telephone line interface 103 includes a NCU for performing telephone line control, and a modem for modulating/demodulating images to be communicated by FAX. The telephone line interface 103 performs FAX communication with an external apparatus via a telephone line.

Reference numeral 104 denotes a USB interface. The USB interface 104 communicates data with an apparatus such as a host computer via a USB cable. Reference numeral 105 denotes a LAN interface. The LAN interface 105 communicates data with an apparatus such as a host computer or a network server via a LAN. The printing apparatus according to the embodiment is able to perform cloud printing. In cloud printing, an image is received from a server via the LAN interface 105, and the received image is printed.

Reference numeral 106 denotes an operating unit for the user to operate. The operating unit 106 is, for example, a touch panel, a key, or a wheel device. When the operating unit 106 is operated by the user, the CPU 100 receives an input of operational information indicative of this operation. Then, an instruction by the user is determined in accordance with the operational information. For example, operational information is inputted as an instruction for causing various types of processing to be executed, such as changes to information on various settings of the printing apparatus, or display of a print setting screen described later.

Reference numeral 107 denotes a display. Under display control by the CPU 100, the display 107 displays various information such as setting information of the printing apparatus stored in the RAM 102, images to be printed, or a guide display presented to the user. Reference numeral 108 denotes a reading unit. The reading unit 108 reads an original document in accordance with read control by the CPU 100, and causes the RAM 102 to store read images obtained by this reading.

Reference numeral 109 denotes a printing unit. Under print control by the CPU 100, the printing unit 109 prints an image based on image data stored in the RAM 102 to a printing medium. FAX data received from an external apparatus by the telephone line interface 103 is stored into a non-volatile memory 110 described later, and an image based on the FAX data is printed by the printing unit 109. When reception of the FAX data is complete, printing of the FAX data is automatically executed by the printing unit 109. Then, after printing is finished, the FAX data is automatically erased from the non-volatile memory 110. Further, image data received from a host computer or a server by the USB interface 104 or the LAN interface 105 is also stored into the RAM 102, and an image based on this image data is printed on a printing medium by the printing unit 109.

In the embodiment, the printing unit 109 includes a storage portion such as a paper cassette that stores a printing medium such as printing paper on which to print an image, a conveying portion that conveys printing paper, and a printing mechanism that prints on printing paper conveyed by the conveying portion. In the embodiment, multiple paper cassettes are provided, each of which can store a different size or different type of printing medium.

Each of the multiple paper cassettes is provided with a sensor for detecting opening/closing (demounting/mounting) of the corresponding paper cassette. When a paper cassette is demounted or mounted by the user, operational information indicating opening/closing of the paper cassette is inputted to the CPU 100 from the sensor of the corresponding cassette. By receiving an input of the operational information, the CPU 100 can determine whether the paper cassette has been opened/closed by the user.

Reference numeral 110 denotes a non-volatile memory such as a hard disk or a flash memory. The non-volatile memory 110 stores various information such as FAX data received by the telephone line interface 103, and paper history information described later.

Reference numeral 111 denotes an internal bus within the printing apparatus. The internal bus 111 interconnects various units of the printing apparatus. The CPU 100 controls the entire printing apparatus by communicating with the ROM 101, the RAM 102, the non-volatile memory 110, and the like via the internal bus 111.

In the embodiment, the CPU 100 of the printing apparatus causes the printing unit 109 to print data to be printed such as an image or text, in accordance with a print instruction by the user inputted from the operating unit 106, or a print instruction inputted via various interfaces. At this time, the CPU 100 acquires information for specifying an attribute of a printing medium to be used in printing, and executes printing in accordance with the attribute specified by the information. In the embodiment, printing is performed on printing paper that serves as a printing medium, and printing is performed in accordance with paper information indicative of an attribute (size and type) of the printing paper. The CPU 100 causes the non-volatile memory 110 to store the paper information as paper history information. Then, when the CPU 100 causes printing to be newly executed, in a case where paper information on the current printing differs from the paper history information stored in the non-volatile memory 110, the CPU 100 displays a warning to that effect on the display 107, and restricts printing. Thereafter, the CPU 100 causes printing to be executed when the CPU 100 receives an input of a print instruction by the user via the operating unit 106. As a result, it is possible to prevent an image from being printed on printing paper different from the printing paper on which the image should be printed, without the printing paper being switched for new printing after printing is performed.

However, performing the above-mentioned processing may result in cases where printing is restricted even through the user has already confirmed the printing paper to be used for new printing, or even through the user has opened a paper cassette to switch the printing paper.

Accordingly, in the embodiment, in a case where the CPU 100 has displayed paper information or when the CPU 100 has detected opening/closing of a paper cassette, it is regarded that the user has confirmed the printing paper to be used in printing. Then, the CPU 100 executes control so that the above-mentioned restriction of printing is not executed, even in a case where the paper information on the current printing is different from paper history information. As a result, it is possible to prevent printing from being restricted on the basis of paper history information, in a case where the user has confirmed the printing paper to be used in printing prior to issuing a print instruction or in a case where the user has switched the printing paper. Details of this processing will be described later.

In the embodiment, the management of paper history information, and the restriction of printing mentioned above are executed by the CPU 100 serving as a print control apparatus inside the printing apparatus. However, this should not be construed restrictively. The above-mentioned processing may be executed by, for example, a host computer or a server connected to the printing apparatus and acting as a print control apparatus.

Figure 2:
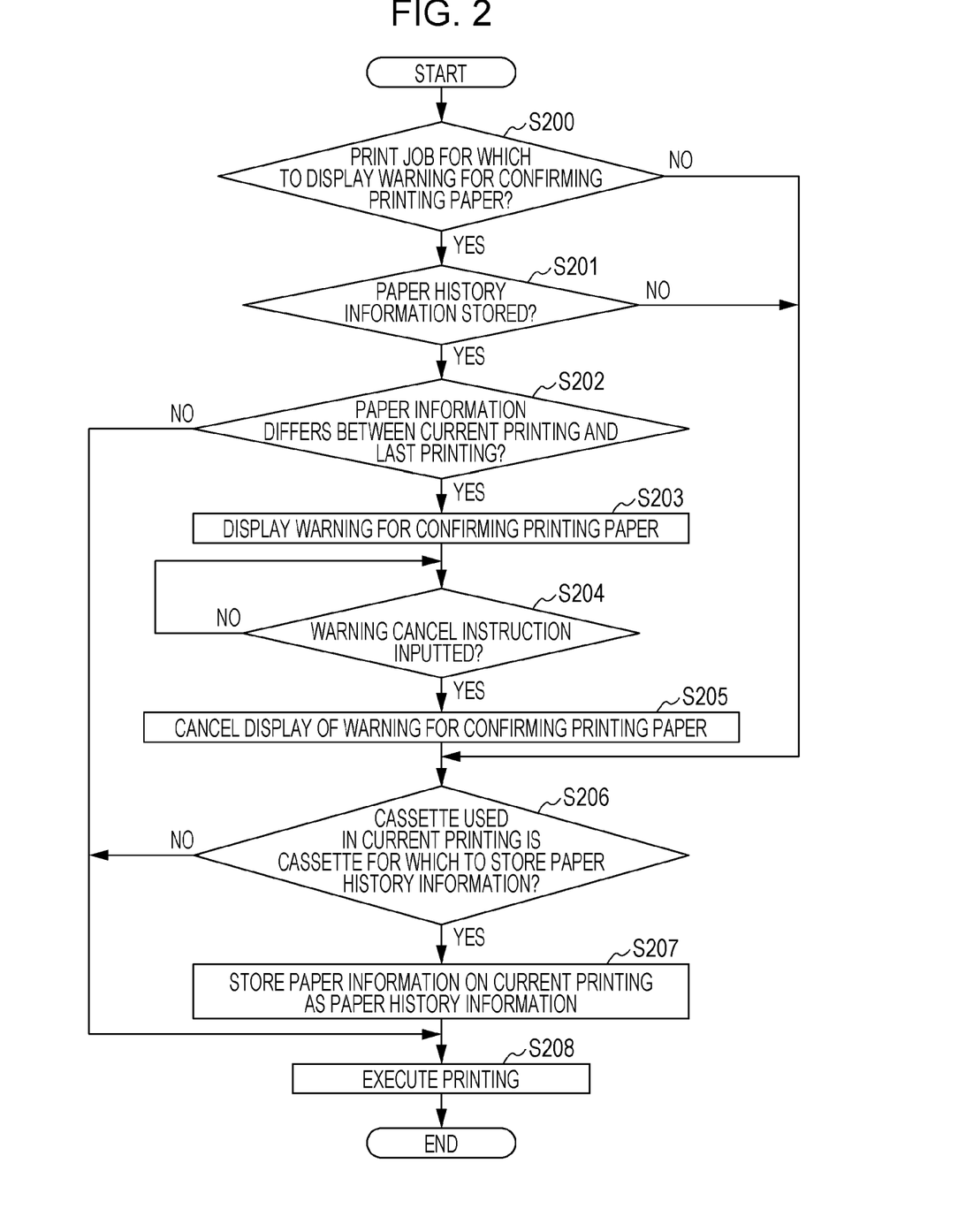
FIG. 2 illustrates a print control executed in the printing apparatus according to the embodiment.

FIG. 2 illustrates a print control executed in the printing apparatus according to the embodiment. The processing illustrated in FIG. 2 is executed when the CPU 100 acquires a print job. A print job is acquired when, for example, the user instructs with the operating unit 106 the printing apparatus to perform printing, or when the printing unit 109 is caused to execute copying of a document image read by the reading unit 108. A print job is also acquired when a FAX document is received by the telephone line interface 103. A print job may be also acquired from an external apparatus such as a host computer or a server by the USB interface 104 and the LAN interface 105. This print job includes data to be printed such as an image or text, and information indicating an attribute of the printing medium on which the data to be printed is printed. In the processing illustrated in FIG. 2, data to be printed is printed on printing paper, and paper information indicating the size and type (such as plain paper or photograph paper) of the printing paper is acquired as the above-mentioned information.

A program corresponding to the processing illustrated in FIG. 2 is stored in the ROM 101. The processing illustrated in FIG. 2 can be executed by the CPU 100 reading the program to the RAM 102 and executing the program on the RAM 102.

In S200, it is confirmed whether a print job inputted to the CPU 100 is a print job for which to display a warning for prompting the user to confirm the printing paper to be used in printing. As described above, in the embodiment, a history of paper information is stored in advance, and a warning is displayed in a case where the history of paper information differs from paper information on the current printing. It is to be noted, however, that in the embodiment, a warning is not displayed for all print jobs but is displayed for a specific print job.

For example, in a case where paper information specified in the current print job indicates plain paper, if photograph paper is stored in the paper cassette, printing may sometimes be executed on photograph paper without the user intending to do so. This presents a particularly serious problem when such printing is erroneously executed without the user intending to do so, because photograph paper is frequently more expensive than plain paper. Accordingly, the above-mentioned warning is displayed in a case where a print job indicates plain paper as paper information. An example in which a warning is displayed for a print job indicating plain paper as paper type will be described later with reference to FIG. 7.

In the embodiment, the multiple paper cassettes provided in the printing unit 109 correspond to different paper sizes. For a paper cassette that stores paper of a size corresponding to both plain paper and photograph paper (for example, A4 size), in some cases, an image that should be printed on plain paper may be printed on photograph paper, without the printing paper being switched. Therefore, in S200, on the basis of the paper cassette corresponding to a print job, a print job that uses a paper cassette storing paper of a size corresponding to both plain paper and photograph paper (for example, A4 size) may be determined as a print job for which to display a warning. The process for determining whether to display a warning in accordance with the paper cassette will be described later with reference to FIG. 8.

In a case where it is determined in S200 that the print job is a print job for which to display a warning, the processing proceeds to S201, and in a case where it is determined that the print job is not a print job for which to display a warning, the processing proceeds to S206 described later.

In S201, it is determined whether paper history information indicative of paper information at the time of the last printing is stored in the non-volatile memory 110. In this regard, paper information at the time when printing is performed is stored into the non-volatile memory 110 in the process of S207 described later. Specifically, paper size and paper type (such as plain paper or photograph paper) are specified in a print job, and the paper size and the paper type are stored as paper information.

As mentioned above, the printing unit 109 according to the embodiment includes multiple paper cassettes. In a case where a warning is to be displayed for a job that uses a specific paper cassette, paper history information corresponding to the paper cassette is stored into the non-volatile memory 110. In a case where a warning is to be displayed regardless of the multiple paper cassettes, paper history information is stored for each of the multiple cassettes.

In a case where it is determined in S201 that paper history information is stored, the processing proceeds to S202, and in a case where it is determined that paper history information is not stored, the processing proceeds to S206 described later.

In S202, it is determined whether the paper information at the time of the last printing differs from the paper information specified by the user at the time of the current printing. Specifically, the paper information indicated by the print job for the current printing is compared with the paper history information stored in the non-volatile memory 110, and in a case where the two pieces of information differ in at least one of paper size and paper type, it is determined that the paper information differs from the paper history information.

In a case where it is determined in S202 that the paper information differs from the paper history information, the processing proceeds to S203, and in a case where it is determined that paper information on the current printing is the same as the paper information on the last printing, printing is automatically executed in S208 described later.

In S203, because paper information on the current printing differs from paper information on the last printing, the display 107 is caused to display a warning screen for prompting the user to confirm the printing paper on which an image is to be printed in the current printing. In S204, it is determined whether the user has inputted an instruction for cancelling the display of warning mentioned above by depressing an OK key included in the operating unit 106. The instruction for cancelling a warning (hereinafter, referred to as "warning cancel instruction") is not limited to depression of a key. For example, a warning may be cancelled by the user touching a predetermined region on a touch panel.

In a case where it is determined in S204 that a warning cancel instruction has been inputted, display of the warning screen for confirming printing paper on the display 107 is cancelled in S205. When the display of warning is cancelled in S205, it is regarded that execution of printing is permitted, and the processing proceeds to S206.

In S206, it is determined whether the paper cassette used in the current printing is a paper cassette for which paper history information is to be stored. For example, in a case where paper information is to be stored for a specific paper cassette corresponding to both plain paper and photograph paper, it is determined whether the paper cassette used in the current printing is the specific paper cassette.

In a case where it is determined in S206 that the paper cassette used in the current printing is a paper cassette for which to store paper history information, the processing proceeds to S207, and in a case where it is determined that the paper cassette is not a paper cassette for which to store paper history information, the processing proceeds to S208 and printing is executed.

In S207, paper information on the current printing is stored into the non-volatile memory 110 as paper history information. The paper history information stored in this way is referenced in S202 mentioned above as paper information on the last printing. In a case where it is determined in S202 that paper information on the current printing and print history information are the same, the storing of paper information in S207 is not executed.

In S208, in accordance with the current paper information specified by an inputted print job, the printing unit 109 is caused to print an image included in the print job.

As described above, according to the processing illustrated in FIG. 2, in a case where paper information corresponding to the last printing and the current paper information are different, a warning for prompting the user to confirm the printing paper stored in the paper cassette and used in printing can be given.

However, for example, in a case where printing is executed on photograph paper, and then printing of FAX data using plain paper is executed, a warning is displayed at the time of printing, and the printing of FAX data is restricted. In this case, the printing of FAX data is not executed unless the user issues a warning cancel instruction. For example, in a case where the user is out on the road, and unable to instruct the printing apparatus to cancel a warning, FAX data accumulates in the non-volatile memory 110 of the printing apparatus. When the amount of FAX data is large, there may be cases where the remaining storage capacity of the non-volatile memory 110 is exceeded, which makes it difficult to print received FAX data properly.

Accordingly, in the embodiment, in a case where paper information is displayed or in a case where opening/closing of the paper cassette is detected, it is regarded that the user has confirmed the printing paper to be used in printing. Further, even in a case where paper information on the current printing differs from paper history information, the above-mentioned restriction of printing is not performed, and printing is automatically executed. Consequently, it is possible to prevent printing from being restricted on the basis of paper history information, even though the user has confirmed the printing paper to be used in printing.

Figure 3:
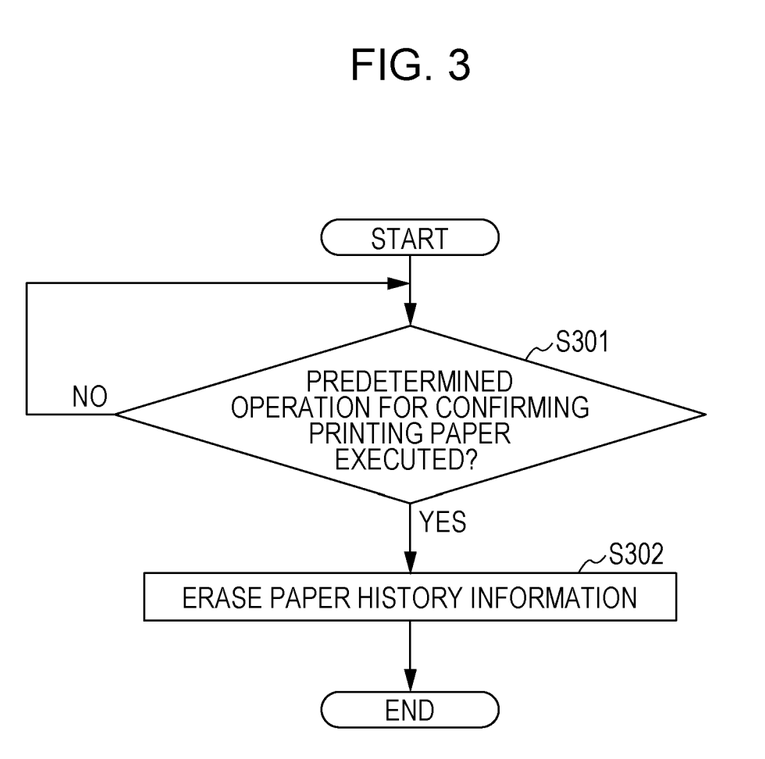
FIG. 3 illustrates erasing of paper history information based on a predetermined operation by the user.

FIG. 3 illustrates erasing of paper history information based on a predetermined operation by the user. The processing illustrated in FIG. 3 is periodically executed by the CPU 100 while the power of the printing apparatus is ON.

In S301, it is determined whether the user has executed a predetermined operation for confirming printing paper. This predetermined operation is an operation for displaying paper information or an operation of opening/closing a paper cassette. If the predetermined operation is detected in S301, the processing proceeds to S302.

In S302, the paper history information stored in a storage area for paper history information in the non-volatile memory 110 is erased, and the processing is ended. Consequently, in a case where a print job is inputted to the printing apparatus after the processing in FIG. 3 is executed, it is determined in S201 in FIG. 2 that paper history information is not stored. Therefore, printing is not restricted in S203 and S204. That is, for example, it is possible to prevent printing from being restricted on the basis of paper history information upon input of a print job, even though the user has confirmed the printing paper to be used in printing by looking at the screen on paper information, and has stored the printing paper into the paper cassette.

In a case where it is determined in S301 that the predetermined operation has not been executed, printing is restricted in accordance with paper history information through the processing illustrated in FIG. 2. Therefore, it is possible to prevent printing from being executed on printing paper not intended by the user because the printing paper is not switched.

In FIG. 3, the CPU 100 erases paper history information so that printing is not restricted when executing printing. However, this should not be construed restrictively. Various kinds of information for restricting printing may be stored as paper history information.

Figure 4:
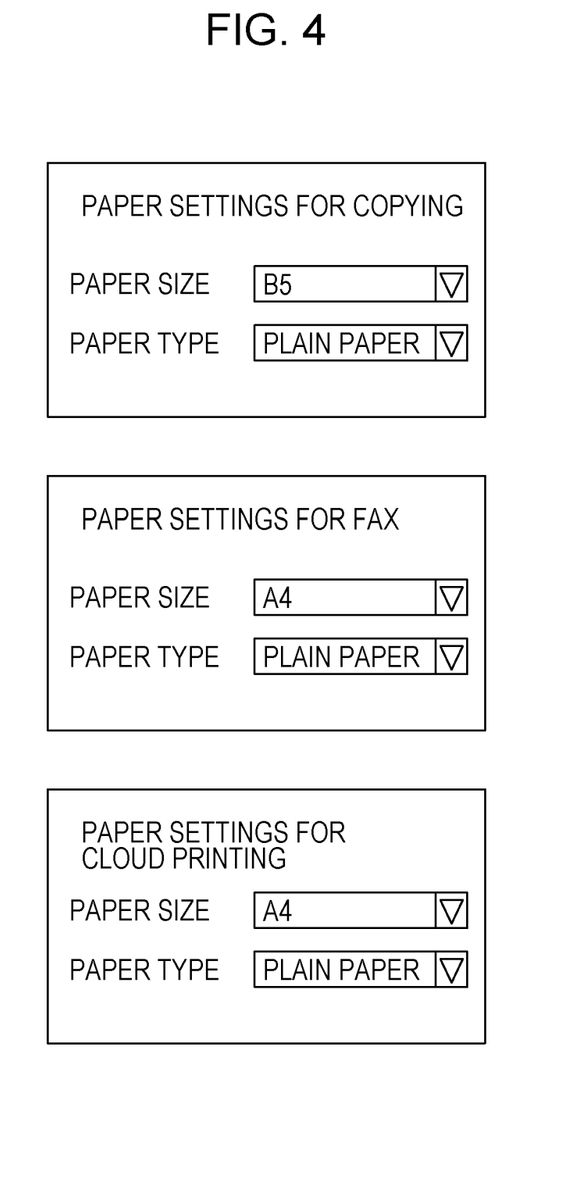
FIG. 4 illustrates an example of paper setting screens according to the embodiment.

Next, the predetermined operation in S301 in FIG. 3 will be described in detail with reference to FIGS. 3 to 6. FIGS. 3 and 4 each illustrate confirming of display of a paper setting screen which is executed as the predetermined operation.

Figure 6:
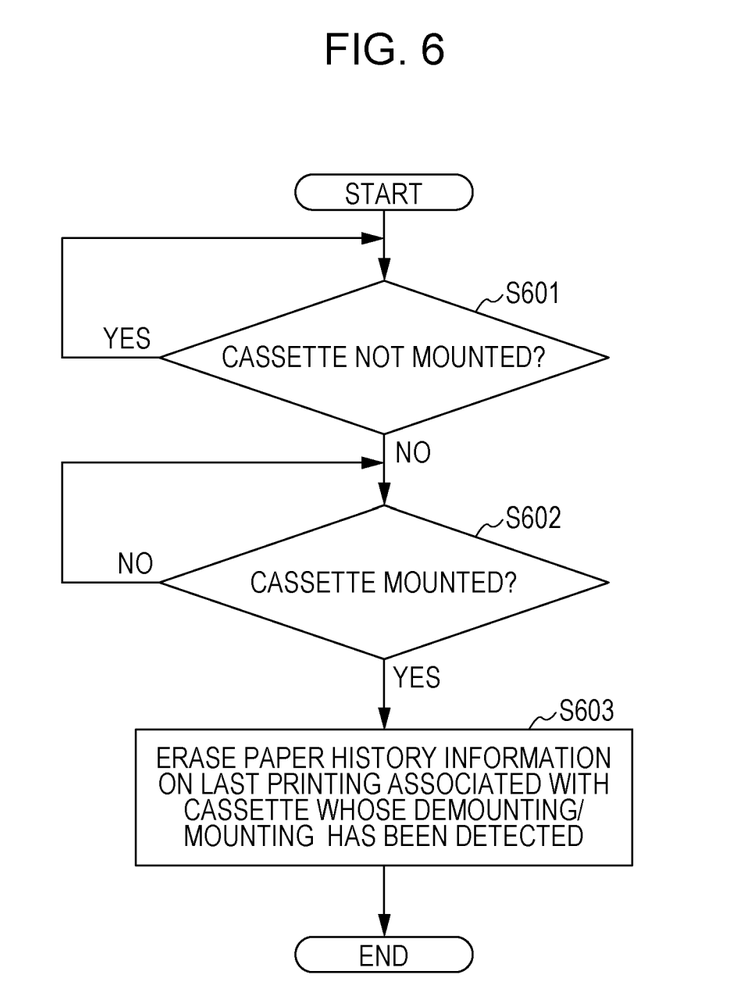
FIG. 6 illustrates erasing of paper history information based on opening/closing of a paper cassette.

FIG. 6 illustrates determining of opening/closing of the paper cassette which is executed as the predetermined operation.

FIG. 4 illustrates an example of paper setting screens according to the embodiment. The paper setting screens illustrated in FIG. 4 are displayed on the display 107 by the CPU 100.

As illustrated in FIG. 4, a paper setting screen is displayed for each type of printing by the printing apparatus such as copy, FAX, or cloud printing. The user operates the operating unit 106 while looking at this paper setting screen, and inputs an instruction for paper settings, thereby setting each of paper size and paper type.

In FIG. 4, the default settings may be changed with respect to paper size and paper type for cloud printing and with respect to paper size for FAX. However, with respect to paper type for FAX, only plain paper may be supported and the default settings may not be changed.

Figure 5:
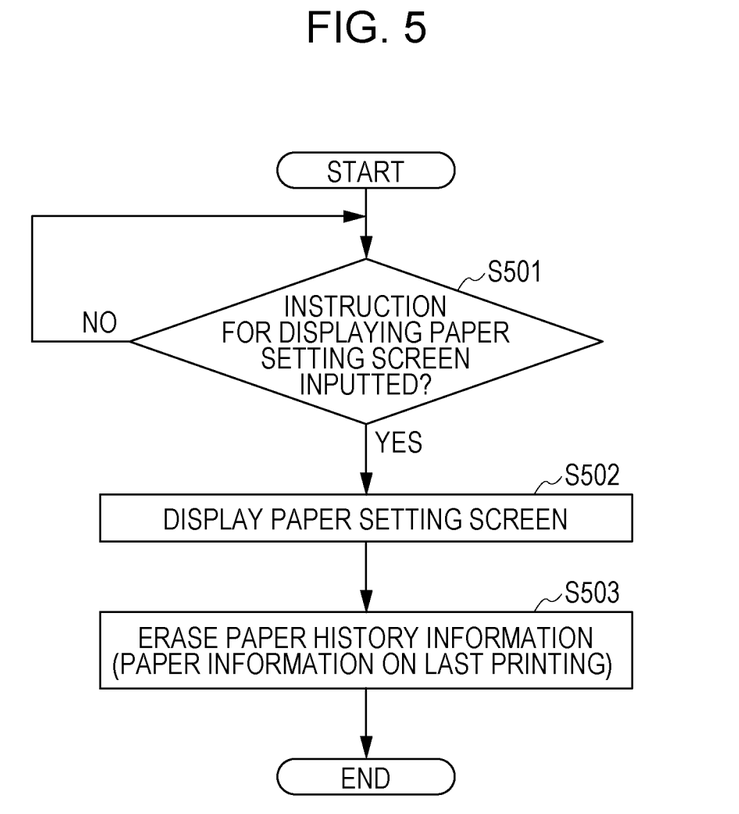
FIG. 5 illustrates erasing of paper history information based on display of a paper setting screen.

FIG. 5 illustrates erasing of paper history information based on display of a paper setting screen. A program corresponding to the processing illustrated in FIG. 5 is stored in the ROM 101, and this processing is periodically executed by the CPU 100 while the power of the printing apparatus is ON.

In S501, it is determined whether operational information indicating an operation made by the user for displaying a paper setting screen on the display 107 as illustrated in FIG. 4 has been inputted. In a case where it is determined in S501 that operational information for displaying a paper setting screen has been inputted, the processing proceeds to S502.

In S502, the paper setting screen is displayed on the display 107. When this paper setting screen is displayed, it is regarded that the user has confirmed the printing paper to be used for each print type, and has set the corresponding printing paper in the cassette. Then, the processing proceeds to S503.

In S503, paper history information (paper information at the time of the last printing) stored in the non-volatile memory 110 is erased so that printing is not restricted in S203 and S204 illustrated in FIG. 2.

Through the processing illustrated in FIG. 5, in a case where the user has caused the paper setting screen to be displayed, paper history information, which is referenced for restricting printing, is erased. Therefore, it is possible to prevent printing from being restricted upon input of a print job for the purpose of confirming printing paper, even though the user has looked at the paper setting screen and has switched the printing paper.

Figure 9:
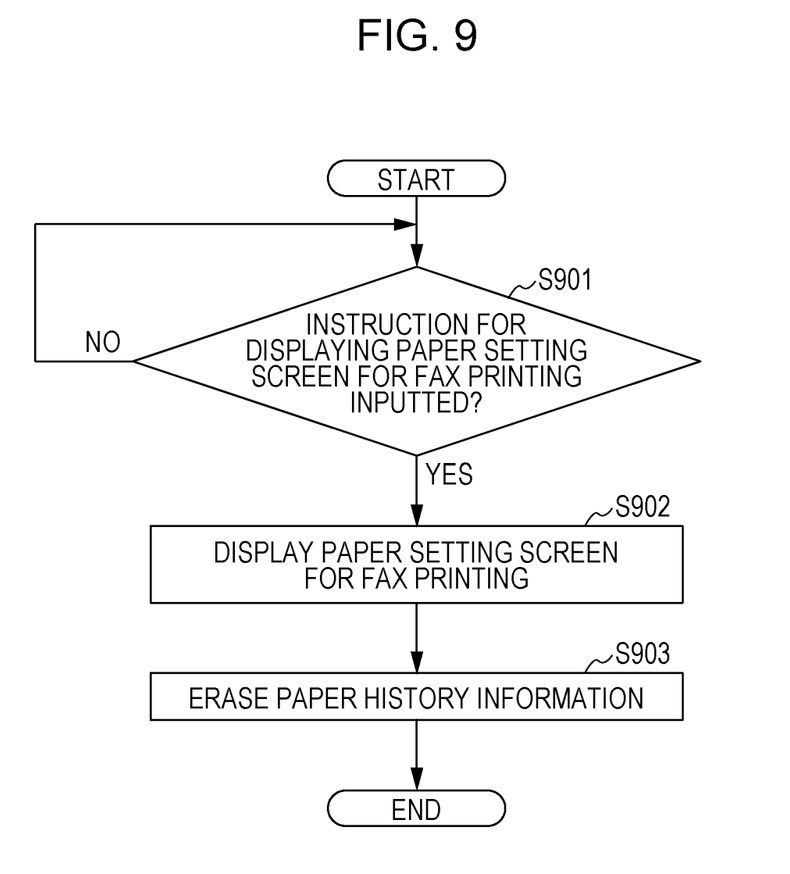
FIG. 9 illustrates erasing of paper history information based on display of a paper setting screen for printing of FAX data.

In FIG. 9 described later, erasing of paper history information will be described with respect to, in particular, a print function such as FAX or cloud printing for printing images received from an external apparatus. In the case of such a print function that receives an image from an external apparatus, the user may not sometimes be present near the printing apparatus during printing. In this case, even if a warning for confirming printing paper is displayed in S203 illustrated in FIG. 2, the user may sometimes be unable to cancel the display of warning. Accordingly, for FAX or cloud printing, in particular, paper history information is erased in accordance with display of the paper setting screen. Details in this regard will be described later with reference to FIG. 9.

FIG. 6 illustrates erasing of paper history information based on opening/closing of a paper cassette. The processing illustrated in FIG. 6 is periodically executed by the CPU 100 while the power of the printing apparatus is ON.

In S601, whether a cassette is not mounted on the printing apparatus is checked by the sensor attached to each of the paper cassettes of the printing unit 109. In a case where it is detected by the sensor on the cassette that the paper cassette has been detached, operational information indicating that the user has opened the cassette is transmitted from the printing unit 109 to the CPU 100. In S601, when the CPU 100 receives the operational information, it is determined that the paper cassette is not mounted. In a case where it is determined in S601 that the paper cassette is not mounted, the processing proceeds to S602.

In S602, it is determined whether a cassette is mounted on the printing apparatus, by the sensor on the cassette. In a case where it is detected in S602 by the sensor on the cassette that the paper cassette has been mounted, operation information indicating that the user has closed the cassette is transmitted from the printing unit 109 to the CPU 100. In S602, when the CPU 100 receives the operational information, it is determined that the paper cassette has been mounted. In a case where it is determined in S602 that the cassette has been mounted on the printing apparatus, it is determined that the user has executed opening/closing of the paper cassette. Then, it is regarded that the user has confirmed the printing paper stored in the paper cassette, and in S603, paper history information corresponding to this paper cassette is erased.

In a case where paper history information is stored for a specific one of multiple paper cassettes, the corresponding paper history information is erased in S603. In a case where paper history information is stored for each of multiple paper cassettes, in S603, paper history information corresponding to the paper cassette that is detected as having been opened/closed in S601 and S602 is erased.

Through the processing illustrated in FIG. 6, it is possible to prevent printing from being restricted on the basis of paper history information upon input of a print job, even though the user has opened/closed the paper cassette and has switched the printing paper.

The embodiment mentioned above is directed to the case where, through the processing illustrated in FIG. 2, a warning is displayed in a case where the print job received by the printing apparatus is a print job for which to display a warning for confirming printing paper, and also in a case where paper information specified by the print job differs from paper history information.

Next, a description will be given of processing whereby a print job that performs printing by using plain paper is determined as a print job for which to display a warning. Since photograph paper is frequently more expensive than plain paper, if an image that should be printed on plain paper is printed on photograph paper without the user intending to do so, this presents a particularly serious problem. Accordingly, by causing a warning to be displayed for a print job that performs printing by using plain paper, a warning can be displayed in appropriate cases. This print control will be described with reference to FIGS. 7 and 8. In this case, by directing attention to printing of FAX data using plain paper, it is supposed that paper history information is erased when a paper setting screen for printing FAX data is displayed. This erasing of paper history information will be described later with reference to FIG. 9.

Figure 7:
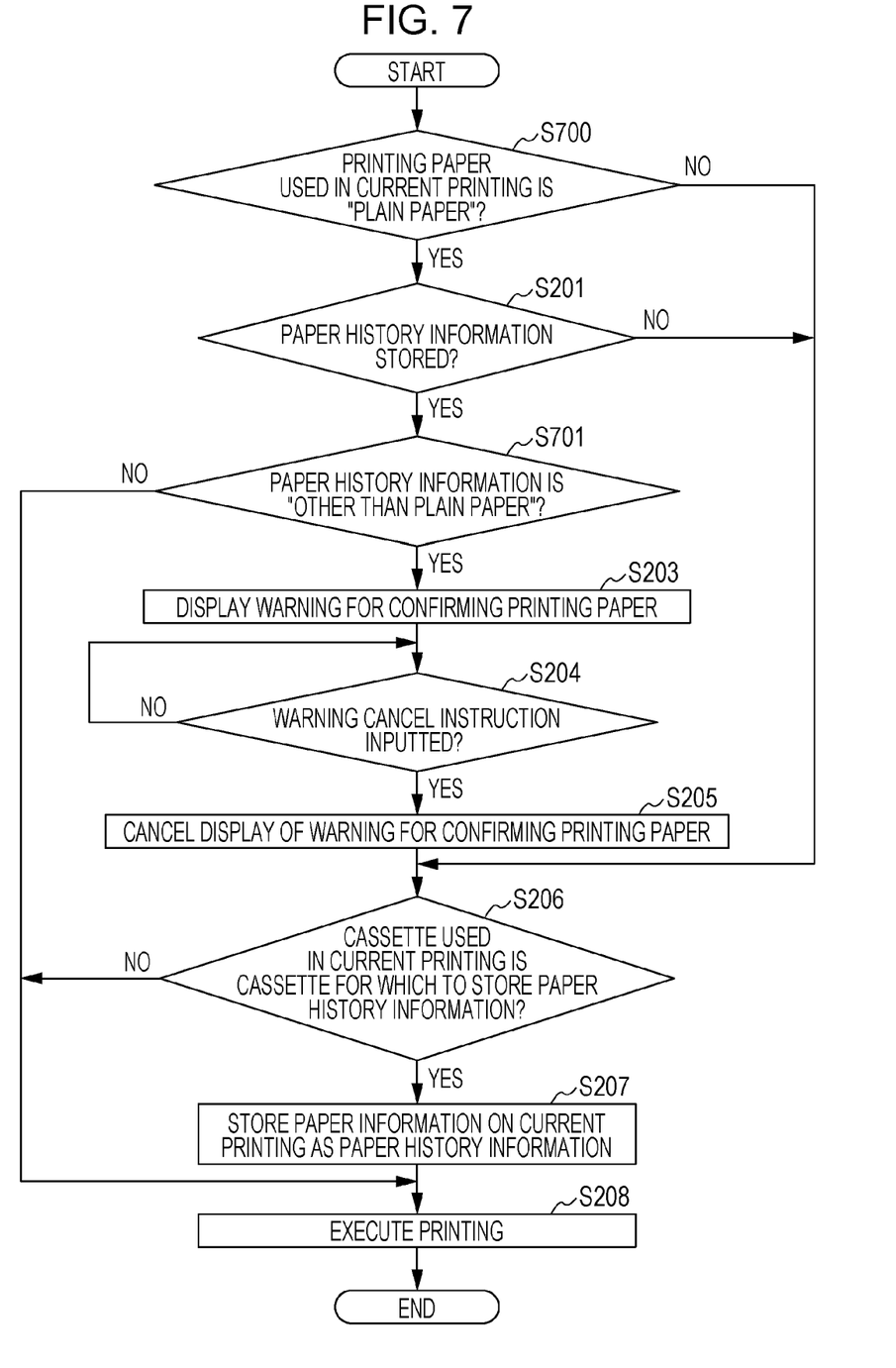
FIG. 7 illustrates a print control in a case where printing is to be restricted for printing of plain paper.

FIG. 7 illustrates a print control in a case where printing is to be restricted for printing of plain paper. In FIG. 7, a description of processes that are the same as those illustrated in FIG. 2 will be omitted. As in FIG. 2, the processing illustrated in FIG. 7 is implemented by the CPU 100 executing a program stored in the ROM 101 when a print job is inputted to the CPU 100. A print job is inputted to the CPU 100 when the user instructs the printing apparatus to perform various types of printing such as copying by operating the operating unit 106, or when a FAX document is received by the telephone line interface 103. Further, the processing illustrated in FIG. 7 is also executed when a print job is inputted to the CPU 100 from a host computer or a server by the USB interface 104 and the LAN interface 105.

In S700, it is determined whether the paper type specified in the current inputted print job is "plain paper". In a case where it is determined in S701 that the paper type specified in the current print job is "plain paper", in S201, it is determined whether paper history information is stored in the non-volatile memory 110. In a case where it is determined in S201 that paper history information is stored, the processing proceeds to S701.

In S701, it is determined whether the paper history information indicates a paper type other than plain paper, such as photograph paper. In a case where it is determined in S701 that the paper history information indicates a paper type other than plain paper, that is, in a case where the paper type specified in the current print job is plain paper, and the paper type specified in the last print job is other than plain paper, the processing proceeds to S203. The processes in S203 to S208 are the same as those in FIG. 2 described above.

According to the processing illustrated in FIG. 7, a print control is executed in the following manner. That is, in a case where the paper type specified in the current print job is plain paper, printing is restricted in accordance with paper history information, and in a case where the print type is other than plain paper, printing is not restricted. Therefore, it is possible to prevent an image that should be printed on plain paper from being erroneously printed on photograph paper, which is expensive. Moreover, according to the print control, printing is not restricted in a case where the paper type is other than plain paper.

In FIG. 7, it is determined in S700 whether the paper type specified in the current print job is plain paper. Accordingly, it suffices that information indicating either "plain paper" or "other than plain paper" be stored as print history information. Therefore, in S207, in a case where the paper type specified in the current print job is not plain paper, the paper type may not be stored as long as information indicating "other than plain paper" is stored.

Next, a description will be given of a case where a warning for confirming printing paper is displayed for a print job that uses paper stored in the lower one of upper and lower paper cassettes provided in the printing apparatus. In the printing apparatus according to the embodiment, each of the upper and lower paper cassettes corresponds to a different paper size. The upper paper cassette does not correspond to A4 size, and the lower paper cassette corresponds to A4 size. Since paper history information is referenced in a case where the paper type in the current printing is plain paper as illustrated in FIG. 7, paper history information is stored only for the lower cassette corresponding to A4 size that is the size of plain paper.

Figure 8:
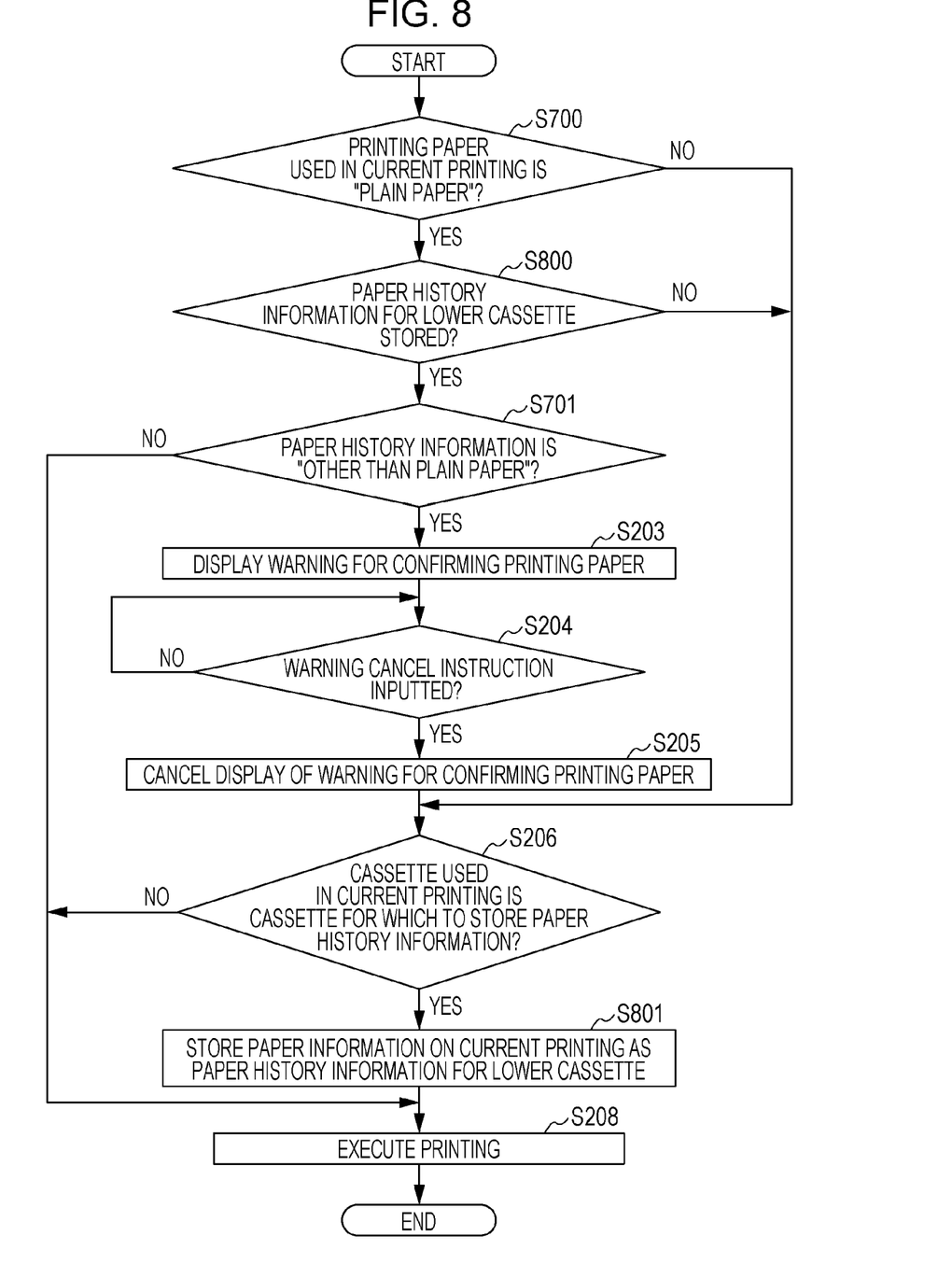
FIG. 8 illustrates a print control in a case where printing is to be restricted for a lower cassette.

FIG. 8 illustrates a print control in a case where printing is to be restricted for a lower cassette.

In FIG. 8, a description of processes that are the same as those illustrated in FIGS. 2 and 7 will be omitted. As in FIGS. 2 and 7, the processing illustrated in FIG. 7 is implemented by the CPU 100 executing a program stored in the ROM 101 when a print job is inputted to the CPU 100. A print job is inputted to the CPU 100 when the user instructs the printing apparatus to perform various types of printing by operating the operating unit 106, or when a FAX document is received by the telephone line interface 103.

In FIG. 8, processes in S800 and S801 differ from FIG. 7.

In S800, it is determined whether paper history information corresponding to the lower cassette is stored. In S801, paper information on the printing paper to be used for the current printing is stored as paper history information corresponding to the lower cassette. Because paper information on the paper corresponding to the upper cassette is not referenced in the example illustrated in FIG. 8, only paper information corresponding to the lower cassette is stored as history.

Through the processing illustrated in FIG. 8, in a case where the paper type specified in the current print job is plain paper, and paper is fed from the lower cassette, paper history information on the printing paper stored in this lower paper cassette is referenced.

In printing FAX data according to the embodiment, in the printing unit 109, of the two paper cassettes, that is, the upper cassette and the lower cassette, plain paper is fed from the lower cassette, and the FAX data is printed on the plain paper. Therefore, through the processing illustrated in FIG. 8, when a print job for printing of FAX data is received, a warning is displayed and printing of the FAX data is restricted in a case where the paper type indicated by paper history information is not plain paper. In the printing of FAX data according to the embodiment, the paper type of the printing paper to be used in printing is uniquely determined to be plain paper. Therefore, in a case where the type of a print job received by the printing apparatus is determined to be a FAX print job, the determination of paper type in S700 illustrated in FIGS. 7 and 8 may not have to be performed. In this way, when printing FAX data, printing of the FAX data is restricted in a case where the print type indicated by paper history information is not plain paper.

However, for example, in a case where the user goes out after executing printing on photograph paper, if FAX is received while the user is out on the road, printing is restricted in accordance with the above-mentioned processing. Then, the amount of FAX data may sometimes exceed the remaining storage capacity of the non-volatile memory 110 of the printing apparatus, making it difficult to print FAX data properly. Accordingly, paper history information is erased when the paper setting screen for printing of FAX data illustrated in FIG. 4 is displayed.

FIG. 9 illustrates erasing of paper history information based on display of a paper setting screen for printing of FAX data. The processing illustrated in FIG. 9 is periodically executed by the CPU 100 while the power of the printing apparatus is ON.

In S901, it is determined whether the user has inputted a display instruction for displaying, on the display 107, the paper setting screen for printing of FAX data as illustrated in FIG. 4. In a case where it is determined in S901 that the display instruction has been inputted, the processing proceeds to S902.

In S902, the paper setting screen for printing of FAX data is displayed on the display 107. When the paper setting screen for printing of FAX data is displayed, it is regarded that the user has confirmed that plain paper is to be used in printing of FAX data, and has set plain paper sheets in the paper cassette. Then, the processing proceeds to S903.

In S903, paper history information stored in the non-volatile memory 110 (paper history information on the last printing for the lower paper cassette) is erased so that printing is not restricted in S203 and S204 illustrated in FIG. 8.

Through the processing illustrated in FIG. 9, when the user causes the paper setting screen for printing of FAX data to be displayed, paper history information, which is referenced for restricting printing, is erased. Therefore, it is possible to prevent printing of FAX data from being restricted for the purpose of confirming printing paper, even though the user has confirmed that plain paper is to be used in printing of FAX data by looking at the paper setting screen used for FAX data printing, and has loaded plain paper into the lower cassette.

For example, there are cases when, after a user confirms that plain paper is to be used in FAX printing on the paper setting screen used for FAX data printing, the user leaves the printing apparatus to go out, for example. In this case, printing is not restricted when the printing apparatus receives FAX data but printing of FAX data stored in the non-volatile memory 110 is automatically executed, and the FAX data is automatically erased from the non-volatile memory 110 when the printing is completed. Therefore, FAX data does not stay in the non-volatile memory 110 of the printing apparatus, and the FAX data can be printed properly.

Paper history information is not erased even if the paper setting screen used for copying is displayed as illustrated in FIG. 4. Therefore, even if a user has looked at the paper setting screen used for copying, in a case where the user has not successfully confirmed that plain paper is to be used in printing of FAX data, it is possible to prevent FAX data from being printed on photograph paper without the user intending to do so.

In some cases, because paper history information is not erased even when the user confirms the printing paper to be used in copying on the paper setting screen used for copying, printing is restricted on the basis of the paper history information. The reason why printing is restricted for FAX and printing is not restricted for copying in this way is that in the case of copying, the user is highly likely to be present near the printing apparatus in comparison to when printing FAX data.

During copying, the user causes the reading unit 108 to read a document, and thus in many cases, the user is present near the printing apparatus when the CPU 100 causes printing to be executed. Therefore, even if a warning for confirming printing paper is displayed and printing is restricted, the user is able to execute an operation for cancelling the display of warning after confirming the printing paper loaded in the paper cassette.

As for printing of FAX data, printing is performed by receiving data to be printed from an external apparatus via a telephone line. Consequently, there is a possibility that the user may not be present near the printing apparatus, and the user may sometimes not be able to immediately cancel the display of warning. Accordingly, as illustrated in FIG. 9, for display of the paper setting screen corresponding to printing of FAX data, printing is not restricted upon input of a print job. As a result, it is possible to prevent FAX data from being accumulated in the memory of the printing apparatus without the user being able to cancel the display of warning.

In a case where paper history information is stored only for the lower paper cassette as illustrated in FIG. 8, the erasing of paper history information based on opening/closing of a paper cassette illustrated in FIG. 6 may be also executed for only the lower paper cassette. That is, paper history information is erased when the lower paper cassette is opened/closed, but paper history information is not erased when the upper paper cassette is opened/closed. Further, the sensor for detecting opening/closing of a paper cassette may be installed only on the lower paper cassette, and opening/closing of the upper paper cassette may not be detected.

Next, a description will be given of cloud printing, which prints data received from a server via a network. As in the printing of FAX data, during this cloud printing, the user may sometimes not be present near the printing apparatus. Therefore, if printing is restricted as a result of paper history information being referenced in the printing apparatus, there may be cases where printing is not executed despite the advantage of cloud printing that a print instruction can be given remotely. For this reason, as in the case of processing executed for printing of FAX data in FIG. 9 mentioned above, when the print setting screen for cloud printing illustrated in FIG. 4 is displayed, print history information may be updated (by erasure or the like) so that printing is not restricted.

Figure 10:
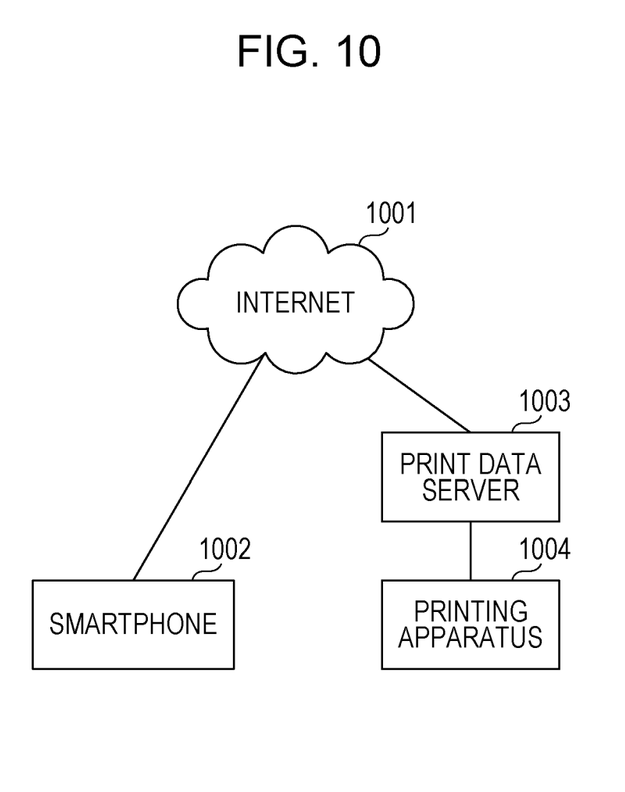
FIG. 10 illustrates a configuration of a cloud print system.

FIG. 10 illustrates a configuration of a cloud print system. First, the user operates a smartphone 1002 connected to an Internet 1001 to specify a piece of content to be printed (hereinafter referred to as "printing target content") and gives an instruction to execute printing. Then, the printing target content, or the URL address of the printing target content is sent from the Internet 1001 to a print data server 1003. In a case where the URL address of the printing target content is sent, the print data server 1003 acquires the print target content by itself on the basis of the URL address sent to the print data server 1003. Next, the print data server 1003 converts the printing target content into print data that can be handled by a printing apparatus 1004. Then, when the print data server 1003 transmits print data to the printing apparatus 1004, the printing apparatus 1004 that has received the print data executes printing by using the printing unit 109.

In this way, cloud printing allows the user to give a print instruction to the printer via the Internet from a remote location or from where the user is out on the road by operating the smartphone 1002. Accordingly, print history information is updated (by erasure or the like) in a case where the print setting screen for cloud printing illustrated in FIG. 4 is displayed. As a result, it is possible to prevent printing from being restricted on the basis of paper history information even though the user has set printing paper after confirming the print setting screen.

In cloud printing, it is also possible for the user to make print settings on the smartphone 1002. If, as a result, the print settings specified on the smartphone 1002 and paper history information stored in the printing apparatus 1004 are different from each other, printing is restricted.

However, in cloud printing, the user of the printing apparatus 1004 gives a print instruction by using the smartphone 1002 in many cases. In these cases, it is assumed that the user has given the print instruction after recognizing the type of printing paper stored in the printing apparatus 1004. That is, in a case where the user has switched the printing paper after causing printing to be executed, the user sometimes specifies paper information on the switched printing paper on the smartphone 1002. If, nevertheless, print history information and this paper information are different, printing is restricted.

Accordingly, printing may be controlled so that in a case where a print job inputted to the printing apparatus is cloud printing, printing is not restricted on the basis of paper history information. Specifically, if the type of a print job is cloud printing in S200 illustrated in FIG. 2, the processes in S201 to S205 are skipped and the processing proceeds to S206, and display of a warning for confirming printing paper and restriction of printing are not executed.

According to the embodiment mentioned above, on the basis of paper history information, in a case where paper information at the time of last printing and paper information on the current printing are different, a warning for confirming printing paper is displayed, and printing is restricted. However, in a case where the user has executed a predetermined operation, such as display of a paper setting screen or opening/closing of a paper cassette, that may be regarded as confirmation of paper information by the user, the above-mentioned paper history information is updated so that printing is not restricted. As a result, it is possible to prevent printing from being restricted when executing printing, even though the user has confirmed the printing paper before giving a print instruction. In addition, printing can be restricted properly when the user has not confirmed the printing paper.

As illustrated in FIGS. 7 and 8, paper history information may be referenced in a case where the paper type specified in the current printing is plain paper. As a result, it is possible to prevent an image that should be printed on plain paper from being printed on expensive, special printing paper such as photograph paper.

Further, as illustrated in FIG. 9, printing may be controlled so that print history information is deleted when, in particular, the paper setting screen for printing of FAX data is displayed. Consequently, for example, in a case where the user goes out after printing on photograph paper, and then FAX data is received while the user is out on the road, printing is not restricted if the user has confirmed the paper setting screen used for FAX prior to going out. Therefore, it is possible to prevent printing from being restricted even though the user has confirmed the printing paper (plain paper) used for FAX. That is, it is possible to prevent FAX data from not being printed because the amount of FAX data exceeds the remaining capacity of the memory of the printing apparatus.

Further, printing may be controlled so that for functions such as copying whereby printing is executed by operating the main body of the printing apparatus, print history information is not deleted even when a paper setting screen is displayed. For these types of printing executed by operating the main body of the printing apparatus, it is frequently the case that when a warning is displayed, the user is able to immediately cancel the display of warning and cause printing to be executed. Therefore, it is possible for the user to prevent printing from being executed on printing paper not intended by the user because the printing paper stored in the printing apparatus has not been switched, and cause printing to be executed on desired printing paper.

For FAX, the user is sometimes away from the printing apparatus. Accordingly, printing is not restricted in a case where the user has confirmed the paper setting screen used for FAX data printing as mentioned above. In this way, according to the embodiment, for those print functions for which it is appropriate to restrict printing, printing may be restricted in accordance with paper history information.

While paper size and paper type are described as an example of paper information in the above embodiment, printing may be restricted in a case where the paper type differs from that of the last printing as illustrated in FIGS. 7 and 8, or printing may be restricted in a case where the paper size differs from that of the last printing. For example, regardless of the type of printing paper, in a case where the size of printing paper stored in the printing apparatus differs from the size indicated by paper information, the image to be printed may extend off the printing paper, or the image may be printed only on a part of the printing paper. Accordingly, printing may be restricted in a case where the size of the printing paper used for the current printing differs from the size used at the time of the last printing, regardless of the type of printing paper.

The above-mentioned embodiment is directed to the case where processing such as storing of paper history information and restriction of printing is executed by the CPU 100 included in the printing apparatus which acts as a print control apparatus. However, this should not be construed restrictively. The processing according to the embodiment may be executed in a print control apparatus that is connected to a printing apparatus and causes the printing apparatus to execute printing, such as a host computer or a server.

While the above-mentioned embodiment is directed to the case where printing paper is used as an example of printing medium on which an image is printed by the printing apparatus, this should not be construed restrictively. The printing medium may be an OHP sheet, or a recording medium such as a CD or a DVD. The processing according to the embodiment may be executed by recording a history of printing medium information indicative of the size and type of such a printing medium.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A program code for implementing the function according to the embodiment(s) may be either executed by a single computer (CPU or MPU), or may be executed by cooperation of multiple computers. Further, the program code may be either executed by a computer, or a piece of hardware such as a circuit for implementing the function of the program code may be provided. Alternatively, a part of the program code may be implemented by a piece of hardware, and the remainder may be executed by a computer.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-285806, filed Dec. 27, 2012, which is hereby incorporated by reference herein in its entirety.

What is claimed is:

1. A device comprising:
a memory; and
at least one processor in communication with the memory, the at least one processor configured to control:
a storage unit configured to store a last printing medium attribute, wherein the last printing medium attribute used in the last printing;
an erasing unit configured to erase the last printing medium attribute stored in the storage unit in a case where a screen for confirming a printing medium attribute used in printing a predetermined data type is displayed;
a receiving unit configured to receive a print job, wherein the print job specifies a printing medium attribute and a data type;
a determination unit configured to determine whether any of a first condition, a second condition, and a third condition is satisfied, wherein the first condition is that the last printing medium attribute stored in the storage unit is erased, the second condition is that the specified data type of the received print job does not match a predetermined data type, and the third condition is that the specified printing medium attribute of the received print job and the last printing medium attribute are the same; and
a control unit configured, if the determination unit determines that none of the first condition, the second condition, and the third condition is satisfied, to restrict an execution of the received print job, and if the determination unit determines that the at least one of the first condition, the second condition, and the third condition is satisfied, to execute the received print job without the restriction.

2. The device according to claim 1, wherein the erasing unit erases the last printing medium attribute in a case where operation is opening/closing of a storage portion is detected, and
wherein the storage portion stores one or more printing media and is included in a printing apparatus that is configured to output the received print job.

3. The device according to claim 1, further comprising a printing unit, wherein the control unit causes the printing unit to print an image based on the received print job.

4. The device according to claim 1, wherein, in a case where an instruction is input by a user after the control unit restricts the execution of the received print job, the control unit executes the received print job.

5. The device according to claim 1, wherein data having the predetermined data type is acquired in accordance with a predetermined acquiring.

6. The device according to claim 5, wherein the predetermined acquiring method is a method of acquiring data to be printed by facsimile.

7. The device according to claim 5, wherein the predetermined acquiring method is a method of acquiring data to be printed via the Internet.

8. A method comprising:
storing a last printing medium attribute, wherein the last printing medium attribute was used in the last printing;
erasing the last printing medium attribute stored in the storage unit in a case where a screen for confirming a printing medium attribute used in printing a predetermined data type is displayed;
receiving a print job, wherein the print job specifies a printing medium attribute and a data type;
determining whether any of a first condition, a second condition, and a third condition is satisfied, wherein the first condition is that the last printing medium attribute stored in the storage unit is erased, the second condition is that the specified data type of the received print job does not match a predetermined data type, and the third condition is that the specified printing medium attribute of the received print job and the last printing medium attribute are the same;
restricting, if the determination unit determines that none of the first condition, the second condition, and the third condition is satisfied, an execution of the received print job; and
executing, if the determination unit determines that the at least one of the first condition, the second condition, and the third condition is satisfied, the received print job without restricting.

9. The device according to claim 8, wherein erasing the last printing medium attribute in a case where operation is opening/closing of a storage portion is detected, and wherein the storage portion stores one or more printing media and is included in a printing apparatus that is configured to output the received print job.

10. The device according to claim 8, wherein, in a case where an instruction is input by a user after the control unit restricts the execution of the received print job, the control unit executes the received print job.

11. The device according to claim 8, wherein data having the predetermined data type is acquired in accordance with a predetermined acquiring.

12. The device according to claim 11, wherein the predetermined acquiring method is a method of acquiring data to be printed by facsimile.

13. The device according to claim 11, wherein the predetermined acquiring method is a method of acquiring data to be printed via the Internet.

14. A non-transitory computer-readable recording medium storing computer executable instructions to cause a computer to execute the method according to claim 8.

* * * * *